(12) United States Patent
Kim

(10) Patent No.: US 8,251,162 B2
(45) Date of Patent: Aug. 28, 2012

(54) TRAVELING AND TURNING DEVICE FOR CONSTRUCTION MACHINE

(75) Inventor: Kang Tae Kim, Changwon-si (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 103 days.

(21) Appl. No.: 12/946,004

(22) Filed: Nov. 15, 2010

(65) Prior Publication Data

US 2011/0120785 A1    May 26, 2011

(30) Foreign Application Priority Data

Nov. 20, 2009    (KR) .................. 10-2009-0112653

(51) Int. Cl.
*B62D 11/04* (2006.01)

(52) U.S. Cl. ..................................... 180/6.48

(58) Field of Classification Search ............. 180/6.2, 180/6.48
See application file for complete search history.

(56) References Cited

U.S. PATENT DOCUMENTS

| | | | | |
|---|---|---|---|---|
| 3,774,707 A | * | 11/1973 | Bridwell et al. | 180/6.48 |
| 4,457,387 A | * | 7/1984 | Taylor | 180/6.48 |
| 5,860,484 A | * | 1/1999 | Kauss | 180/6.48 |

* cited by examiner

*Primary Examiner* — Tony Winner

(74) *Attorney, Agent, or Firm* — Ladas & Parry LLP

(57) ABSTRACT

A traveling and turning device for a construction machine is provided, which includes a left driving motor and a right driving motor driven by hydraulic fluid, a left main control valve and a right main control valve controlling movement of the left driving motor and the right driving motor, respectively, and a left pedal and a right pedal adjusting the operation state of the left main control valve and the right main control valve, respectively. One of the left pedal and the right pedal enables the construction machine to make forward and backward movement by simultaneously applying pressure to a left side of a spool of the left main control valve and a left side of a spool of the right main control valve or by simultaneously applying pressure to a right side of the spool of the left main control valve and a right side of the spool of the right main control valve, and the other of the left pedal and the right pedal enables the construction machine to make turning movement by simultaneously applying pressure to the left side of the spool of the left main control valve and the right side of the spool of the right main control valve or by simultaneously applying pressure to the right side of the spool of the left main control valve and the left side of the spool of the right main control valve.

2 Claims, 2 Drawing Sheets

TRAVELING AND TURNING DEVICE FOR CONSTRUCTION MACHINE

CROSS-REFERENCE TO RELATED APPLICATION

This application is based on and claims priority from Korean Patent Application No. 10-2009-112653, filed on Nov. 20, 2009 in the Korean Intellectual Property Office, the disclosure of which is incorporated herein in its entirety by reference.

BACKGROUND OF THE INVENTION

1. Field of the Invention

The present invention relates to a traveling and turning device for a construction machine, and more particularly to a traveling and turning device for a construction machine, which can make forward and backward movement in the case where one of left and right pedals is manipulated and make turning movement in the case where the other of the left and right pedals is manipulated.

2. Description of the Prior Art

As illustrated in FIG. 1, a traveling and turning device for a construction machine in the related art includes left and right pedals, left and right main control valves, and left and right driving motors.

If hydraulic fluid is supplied, the construction machine is driven by the driving motors. The supply of hydraulic fluid to the driving motors is controlled by the main control valves. By manipulating the left and right pedals, the operation state of the main control valves can be adjusted.

In the case of operating the construction machine in the related art, the left and right pedals are separately manipulated, and thus it is required for an operator to manipulate the left and right pedals simultaneously. Such simultaneous manipulation of the left and right pedals causes an operator inconvenience, and if the operator fails to intensively make the pedal manipulation, the traveling direction of the construction machine may be against the operator's intention to cause accident occurrence.

Consequently, according to the construction machine in the related art, the left and right pedals should be simultaneously operated in the case of the forward traveling, turning, or backward traveling of the construction machine. Also, since the traveling direction is changed according to the manipulation angle of the left and right pedals, continuous manipulation of the left and right pedals is required during the traveling.

SUMMARY OF THE INVENTION

Accordingly, the present invention has been made to solve the above-mentioned problems occurring in the prior art while advantages achieved by the prior art are maintained intact.

An embodiment of the present invention relates to a traveling and turning device for a construction machine, which can easily make accurate forward and backward movement and turning movement by controlling main control valves in the same direction through manipulation of one of left and right pedals and controlling the main control valves in opposite directions through manipulation of the other of the left and right pedals.

In one aspect of the present invention, there is provided a traveling and turning device for a construction machine, which includes a left driving motor and a right driving motor driven by hydraulic fluid; a left main control valve and a right main control valve controlling movement of the left driving motor and the right driving motor, respectively; and a left pedal and a right pedal adjusting the operation state of the left main control valve and the right main control valve, respectively; wherein one of the left pedal and the right pedal enables the construction machine to make forward and backward movement by simultaneously applying pressure to a left side of a spool of the left main control valve and a left side of a spool of the right main control valve, or by simultaneously applying pressure to a right side of the spool of the left main control valve and a right side of the spool of the right main control valve; and wherein the other of the left pedal and the right pedal enables the construction machine to make turning movement by simultaneously applying pressure to the left side of the spool of the left main control valve and the right side of the spool of the right main control valve, or by simultaneously applying pressure to the right side of the spool of the left main control valve and the left side of the spool of the right main control valve.

The traveling and turning device for a construction machine as constructed above according to an embodiment of the present invention has the following advantages.

First, accurate forward and backward movement can be made by manipulating any one of the left and right pedals, and thus an operator's fatigue can be resolved.

Second, since accurate movement of the construction machine can be made during the forward and backward movement, the construction machine can be moved more safely.

Third, since accurate turning movement can be made by manipulating any one of the left and right pedals during the turning movement in the left or right direction, the turning movement of the construction machine can be easily performed.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
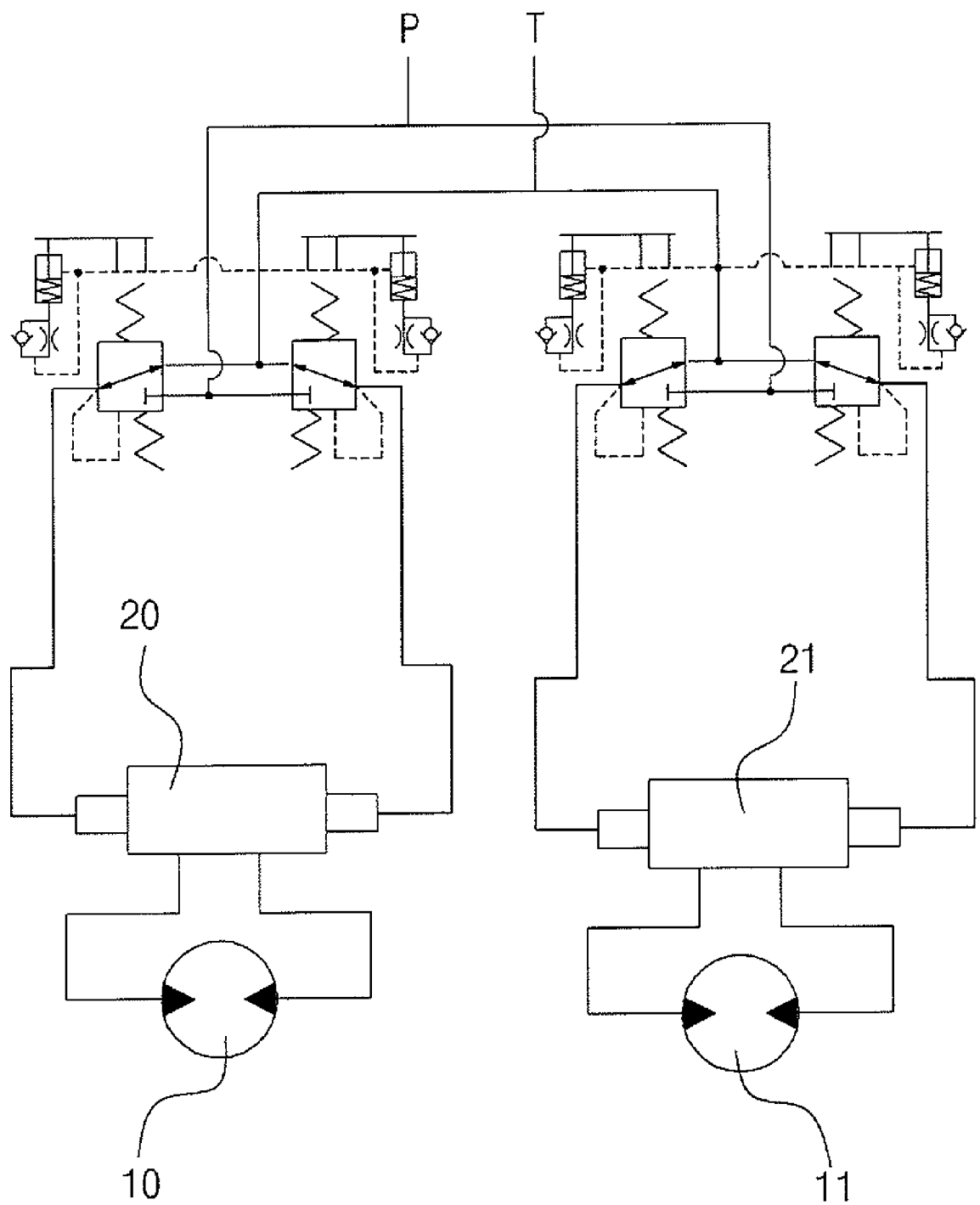
FIG. 1 is a hydraulic circuit diagram of a construction machine in the related art.

Hereinafter, a hydraulic cylinder cushion device according to preferred embodiments of the present invention will be described with reference to the accompanying drawings. In the drawings, thicknesses of lines, sizes of the constituent elements, or the like may be exaggerated for clarity in explanation.

Also, the spatially defined wordings in consideration of the functions of the present invention may differ in accordance with a user's or operator's intention or custom, and the definition of such wordings should be made based on the contents throughout the entire description of the present invention.

In addition, the matters defined in the description, such as the detailed construction and elements, are nothing but specific details provided to assist those of ordinary skill in the art in a comprehensive understanding of the invention, and thus the embodiments including constituent elements which are included in the entire description of the present invention and are replaceable as equivalents of the constituent elements in the claims may be included in the scope of the present invention.

Figure 2:
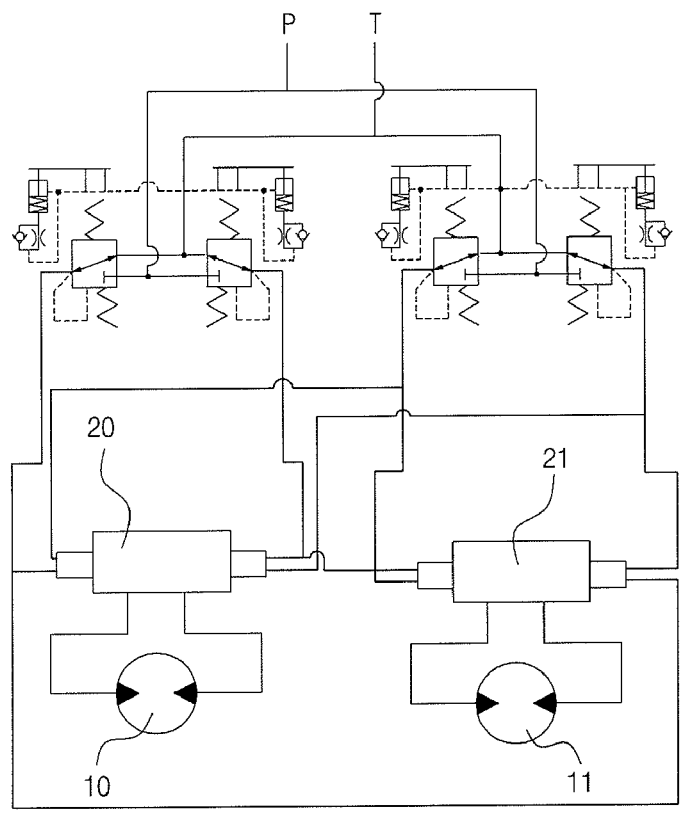
FIG. 2 is a hydraulic circuit diagram of a construction machine according to an embodiment of the present invention.
Figure 3:
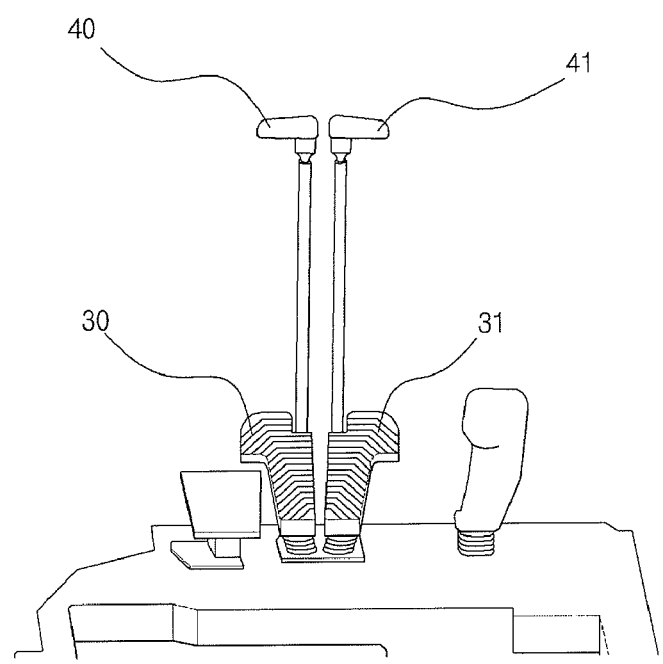
FIG. 3 is a perspective view of left and right pedals of the construction machine illustrated in FIG. 2.

FIG. 1 is a hydraulic circuit diagram of a construction machine in the related art. FIG. 2 is a hydraulic circuit diagram of a construction machine according to an embodiment of the present invention, and FIG. 3 is a perspective view of left and right pedals of the construction machine illustrated in FIG. 2.

A traveling and turning device for a construction machine according to an embodiment of the present invention includes a left driving motor 10 and a right driving motor 11 driven by hydraulic fluid; a left main control valve 20 and a right main control valve 21 controlling movement of the left driving motor 10 and the right driving motor 11, respectively; and a left pedal 30 and a right pedal 31 adjusting the operation state of the left main control valve 20 and the right main control valve 21, respectively; wherein one of the left pedal 30 and the right pedal 31 enables the construction machine to make forward and backward movement by simultaneously applying pressure to a left side of a spool of the left main control valve 20 and a left side of a spool of the right main control valve 21, or by simultaneously applying pressure to a right side of the spool of the left main control valve 20 and a right side of the spool of the right main control valve 21; and wherein the other of the left pedal 30 and the right pedal 31 enables the construction machine to make turning movement by simultaneously applying pressure to the left side of the spool of the left main control valve 20 and the right side of the spool of the right main control valve 21, or by simultaneously applying pressure to the right side of the spool of the left main control valve 20 and the left side of the spool of the right main control valve 21.

As illustrated in FIG. 2, the traveling and turning device for a construction machine according to an embodiment of the present invention includes the left driving motor 10 and the right driving motor 11, the left main control valve 20 and the right main control valve 21, and the left pedal 30 and the right pedal 31.

As the left driving motor 10 and the right driving motor 11 installed on the left and right sides of the construction machine, respectively, are driven, traveling movement and turning movement of the construction machine become possible. The left driving motor 10 and the right driving motor 11 are driven by hydraulic fluid, and flow paths are connected to the left driving motor 10 and the right driving motor 11, respectively, to make the hydraulic fluid flow in and out.

As illustrated in FIG. 2, hydraulic pressure lines are connected between the left and right driving motors 10 and 11 and the left and right main control valves 20 and 21, and the left driving motor 10 and the right driving motor 11 are controlled by the left main control valve 20 and the right main control valve 21, respectively. The left main control valve 20 and the right main control valve 21 control the direction, pressure and flow rate of hydraulic fluid supplied from a hydraulic pump.

If an operator manipulates the left pedal 30 or the right pedal 31 of the construction machine, the left main control valve 20 and the right main control valve 21 drive the left driving motor 10 and the right driving motor 11, respectively, in accordance with the operator's manipulation.

In the case of the construction machine in the related art, as illustrated in FIG. 1, the left driving motor 10 is manipulated by the left pedal 30 and the right driving motor 11 is manipulated by the right pedal 31, the operator should operate all the left pedal 30 and the right pedal 31 during the forward/backward movement or turning movement.

In the case of the construction machine according to an embodiment of the present invention, in order to solve the problems involved in the related art, the hydraulic circuit is configured so that any one of the left pedal 30 and the right pedal 30 controls the left driving motor 10 and the right driving motor 11 to be simultaneously moved in the same direction and the other of the left pedal 30 and the right pedal 30 controls the left driving motor 10 and the right driving motor 11 to be moved in opposite directions to each other.

By configuring the hydraulic circuit as illustrated in FIG. 2, the traveling and turning movement can be controlled using only either of the pedals, and thus the operation of a caterpillar vehicle or construction machine can be controlled much easier.

That is, in the case of moving the right pedal 31 forward or backward of the neutral position, the pressure is simultaneously applied to the left side of the spool of the left main control valve 20 and the left side of the spool of the right main control valve 21, or the pressure is simultaneously applied to the right side of the spool of the left main control valve 20 and the right side of the spool of the right main control valve 21. Accordingly, the left driving motor 10 and the right driving motor 11 are simultaneously rotated in the same direction to enable the construction machine to make forward or backward movement.

Also, in the case of moving the left pedal 31 forward or backward of the neutral position, the pressure is simultaneously applied to the left side of the spool of the left main control valve 20 and the right side of the spool of the right main control valve 21, or the pressure is simultaneously applied to the right side of the spool of the left main control valve 20 and the left side of the spool of the right main control valve 21. Accordingly, the left driving motor 10 and the right driving motor 11 are simultaneously rotated in the opposite directions to each other to enable the construction machine to make turning movement.

In the case of the forward and backward movement, if any one of the left pedal 30 and the right pedal 31 is moved forward of the neutral position, the construction machine makes the forward movement, while if any one of the left pedal 30 and the right pedal 31 is moved backward of the neutral position, the construction machine makes the backward movement.

Also, in the case of the turning movement, if the other of the left pedal 30 and the right pedal 31, which is not for the forward and backward movement as described above, is moved backward of the neutral position, the left-side caterpillar is moved backward and the right-side caterpillar is moved forward to achieve the left turning of the construction machine. If the other of the left pedal 30 and the right pedal 31 is moved forward of the neutral position, the construction machine is turned to the right.

As illustrated in FIG. 3, in addition to the left pedal 30 and the right pedal 31, a left lever 40 and a right lever 41 may be installed to perform the same operation.

FIGS. 2 and 3 exemplarily illustrate a case where the forward and backward movement is controlled by the right pedal 31 and the turning movement is controlled by the left pedal 30. It is also possible that the forward and backward movement is controlled by the left pedal 30 and the turning movement is controlled by the right pedal 31.

In the case where the hydraulic circuit is configured so that the left and right caterpillars are simultaneously controlled in the same direction by the manipulation of the right pedal 31 or the right lever 41 illustrated in FIG. 3, the construction machine is moved forward by moving the right pedal forward of the neutral position, while the construction machine is moved backward by moving the right pedal 31 backward of the neutral position.

Also, in the case where the hydraulic circuit is configured so that the left and right caterpillars are simultaneously controlled in opposite directions to each other by the manipulation of the left pedal 30 or the left lever 40 illustrated in FIG. 3, the construction machine is turned to the right by moving the left pedal 30 forward of the neutral position, while the construction machine is turned to the left by moving the left pedal 30 backward of the neutral position.

In the traveling and turning device for a construction machine according to an embodiment of the present invention, the pressure of the hydraulic fluid is controlled according to the manipulation distance of the left pedal 30 and the right pedal 31, and thus it is possible to adjust the traveling and turning speed.

In the case where the hydraulic circuit is configured so that the left and right caterpillars are simultaneously controlled in the same direction by the manipulation of the right pedal 31 or the right lever 41 illustrated in FIG. 3, the construction machine is moved forward and backward by the forward and backward movement of the right pedal 31. In this case, the pressure of the hydraulic fluid is controlled according to the manipulation distance of the right pedal 31 or the right lever 41, and thus it is possible to adjust the speed of the forward and backward movement.

Also, in the case where the hydraulic circuit is configured so that the left and right caterpillars are simultaneously controlled in opposite directions to each other by the manipulation of the left pedal 30 or the left lever 40 illustrated in FIG. 3, the construction machine is turned to the right and to the left by the forward and backward movement of the left pedal 30. In this case, the pressure of the hydraulic fluid is controlled according to the manipulation distance of the left pedal 30 or the left lever 40, and thus it is possible to adjust the speed of the turning movement.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is clamed is:

1. A traveling and turning device for a construction machine, comprising:
   a left driving motor and a right driving motor driven by hydraulic fluid;
   a left main control valve and a right main control valve controlling movement of the left driving motor and the right driving motor, respectively; and
   a left pedal and a right pedal adjusting the operation state of the left main control valve and the right main control valve, respectively;
   wherein one of the left pedal and the right pedal enables the construction machine to make forward and backward movement by simultaneously applying pressure to a left side of a spool of the left main control valve and a left side of a spool of the right main control valve, or by simultaneously applying pressure to a right side of the spool of the left main control valve and a right side of the spool of the right main control valve; and
   wherein the other of the left pedal and the right pedal enables the construction machine to make turning movement by simultaneously applying pressure to the left side of the spool of the left main control valve and the right side of the spool of the right main control valve, or by simultaneously applying pressure to the right side of the spool of the left main control valve and the left side of the spool of the right main control valve.

2. The traveling and turning device according to claim 1, wherein pressure of hydraulic fluid is controlled according to a manipulation distance of the left pedal and the right pedal to adjust traveling and turning speeds of the construction machine.

* * * * *